US005765211A

United States Patent [19]

Luck

[11] Patent Number: 5,765,211

[45] Date of Patent: Jun. 9, 1998

[54] SEGMENTING NON-VOLATILE MEMORY INTO LOGICAL PAGES SIZED TO FIT GROUPS OF COMMONLY ERASABLE DATA

[75] Inventor: Xavier Luck, Paris, France

[73] Assignee: Schlumberger Industries, Montrouge, France

[21] Appl. No.: 730,747

[22] Filed: Oct. 15, 1996

[30] Foreign Application Priority Data

Oct. 18, 1995 [FR] France ............................. 95 12328

[51] Int. Cl.$^6$ .............................. G06F 12/06; G06F 12/16
[52] U.S. Cl. ...................... 711/209; 711/173; 711/153; 711/103; 395/182.01
[58] Field of Search .......................... 711/173, 171, 711/170, 153, 103, 209; 395/182.01

[56] References Cited

U.S. PATENT DOCUMENTS

| 3,970,999 | 7/1976 | Elward ................................ 711/2 |
| 4,447,887 | 5/1984 | Imazeki et al. ..................... 711/116 |
| 5,185,720 | 2/1993 | Vaillancourt et al. ............ 365/189.02 |
| 5,210,854 | 5/1993 | Beaverton et al. ................. 395/500 |
| 5,371,876 | 12/1994 | Ewertz et al. ..................... 711/159 |
| 5,430,856 | 7/1995 | Kinoshita ......................... 711/209 |

FOREIGN PATENT DOCUMENTS

| A 2 699 704 | 6/1994 | France . |
| WO 94/24673 | 10/1994 | WIPO . |

Primary Examiner—Tod R. Swann
Assistant Examiner—J. Peikari
Attorney, Agent, or Firm—Frishauf, Holtz, Goodman, Langer & Chick, P.C.

[57] ABSTRACT

An electronic component including an electrically erasable non-volatile memory for storing information structured in logical entities that are managed by a memory manager. The memory is segmented into pages for the purpose of erasing the information. The memory manager is programmed to organize at least one type of logical entity into pages. Each of the logical entities occupies, at least in part, an integer number of pages in an exclusive manner. This technique is applicable to electronic components to which the electrical power supply is liable to be interrupted in an untimely manner.

16 Claims, 1 Drawing Sheet

SEGMENTING NON-VOLATILE MEMORY INTO LOGICAL PAGES SIZED TO FIT GROUPS OF COMMONLY ERASABLE DATA

FIELD OF THE INVENTION

The present invention relates to electronic components, including an electrically-erasable non-volatile memory, the electrical power supply to which may be interrupted in an untimely manner thus causing a resultant loss of data and, in particular, to a technique for saving the data under such circumstances.

BACKGROUND OF THE INVENTION

Electronic components are known that are provided with electrically-erasable non-volatile memories, such as EEPROM, flash EPROM, etc. In general, such memories are intended to store information that is structured in logical entities, for example directories, files, etc.

The arrangement with which such information is stored is controlled by a memory manager. The memory manager keeps account of certain physical constraints which are usually set by the manufacturer of such components, such as the memory being segmented into "words" for reading purposes and into "pages" for the purposes of erasure and of writing.

"Words" are small groups of bits suitable for being read together, and they generally comprise 8-bit bytes, although they may sometimes be larger in size, e.g. 16 bits or even 32 bits.

"Pages" are physical entities that are larger than words, and they represent the smallest groups of bits that can be erased. Writing is also possible by page. For example, some components are organized to have byte-sized words with pages of 4 bytes each, each byte being independently addressable for reading, but erasure and writing being possible only for an entire page at a time. In such a configuration, a single byte can have information written therein only:

(i) if it is initially blank, or more precisely if the prior state of the byte is such that writing the new value does not require any of its bits to be erased (in general, this situation arises only occasionally);

(ii) otherwise, by erasing an entire page, and then rewriting it in full.

Some of such components are used in conditions where their electrical power supply may be interrupted at any moment. This applies in particular to the components used in electronic memory cards (i.e. "smart" cards), or in electronic memory keys. It also applies to components used in PCMCIA cards and, more generally, to any components used in objects that are detachable from an external power supply.

Under such conditions, an interruption of power supply to the component may take place at any moment during the processing of information by its memory manager. In particular, if the interruption occurs while an erase-write operation is taking place, the data being written is lost. Various techniques have been proposed for detecting such a situation and reestablishing a coherent state for the memory. In this respect, reference may be made to French patent No. 2 699 704.

The interruption of power supply may have more severe consequences for a configuration in which a single page has two physical zones P1 and P2 allocated to two different logical entities that are completely independent from each other. If it is desired to modify the information contained in one of the zones, e.g. P2, without modifying the information contained in the other zone P1, it is necessary to begin by reading the information contained in both P1 and P2, and to store that information in volatile memory (RAM), after which the entire page is erased and the information in the RAM relating to the second logic entity is modified, and finally the now-blank page can have written in its zone P1 the unmodified information relating to the first logic unit, and in its zone P2 the modified information relating to the second logic unit. In the event of the power supply being interrupted, not only is the information from the zone P2 lost, but so is the information that was contained in the zone P1. If no recovery mechanism is provided, the loss of information from P1 is final. Unfortunately, recovery mechanisms rely on information being duplicated, and they therefore consume a large amount of memory. That is why it is exceptional for the entire usable memory of a component to be protected against untimely erasure.

OBJECTS AND SUMMARY OF THE INVENTION

Thus, an object of the present invention is to provide a technique to avoid loss of information from an electronic component, including an electrically-erasable non-volatile memory, that can otherwise take place in the event of an interruption in the electrical power supply of the component.

This and other objects are attained in accordance with one aspect of the invention which is directed to a method of storing information in an electrically erasable non-volatile memory, such information being structured into logical entities. The memory is segmented into pages, each of which includes a plurality of bits from the memory that are erasable together. At least a selected one of the logical entities is organized into data pages sized to correspond with the memory pages. The information stored in the memory is organized so that the at least one selected logical entity occupies, in an exclusive manner, an integer number of the memory pages.

In other words, a page allocated to the logical entities for one or several types, such as directories, files, etc., contains only information relating to one of the logical entities, to the exclusion of any other logical entity.

In this way, the operation of changing information implies erasing and writing only information that is to be modified, without any need to erase and rewrite information that is not to be modified and which relates to some other logical entity, thereby preventing data corruption.

This amounts to providing physical "synchronization" of the memory in the sense that the way in which logical information is subdivided corresponds to the way in which the memory is subdivided into physical blocks, in this case pages.

As mentioned above, the logical entities include the following types: directory, file of a directory, record of a file, directory header and file header. In the case of a directory header or file header, one aim is to to guarantee that pages containing headers are never erased except for the purpose of modifying the data itself. Provision may also be made for headers to be backed-up in a specific manner.

This implementation of the invention is of particular importance. Header data is highly sensitive, and any corruption thereof can lead to total loss not only of a file or of a directory, but also of other data if it is a pointer that is corrupted.

Different types of synchronization can be combined. For example, directories, files, and headers can be synchronized, without synchronizing records. It is also possible to synchronize records in certain files because they are particularly important, while not synchronizing records in other files.

It is also useful for synchronization to be accompanied by another mechanism for checking write integrity, whereby said file manager is suitable for detecting that information has been corrupted and for restoring said information. It would be paradoxical to prevent corruption in a file A while writing to a file B if no precautions were taken against the possibility of file A becoming corrupted while writing is taking place in said file A itself.

Whatever the method of synchronization and the mechanism of detecting corruption, the invention provides for the memory manager to be implanted in the component with said memory. This configuration presents several advantages.

The first advantage is compatibility. The external system which makes use of the memory does not need to know exactly how the component operates, nor does it need to know how it is segmented in words and pages, nor does it need to know how the anticorruption and synchronization mechanisms are managed. Existing devices can therefore use memories with or without synchronization.

The second advantage is optimization. The synchronization mechanism depends closely on the physical operation of the component and on the organization of logical entities in the physical memory. The designer of an external system would be less well placed than the designer of the component itself to optimize the memory manager. For example, the size of file or directory headers can be optimized as a function of page size. The designer could group headers together without synchronizing them with the pages, but while providing special updating mechanisms. Or else, on the contrary, particularly if page size is small, it may be advantageous to synchronize the headers, thereby simplifying their updating mechanism. If pages are large, an intermediate solution might be to group a plurality of headers together in a page, thereby leading to a special updating mechanism and a great saving in space.

The third advantage is security. Since the memory manager program is implanted in the component, the data cannot be corrupted by error or by accident. Configurations can exist where a single memory is used by different user systems, with the systems being designed independently from one another. This applies, for example, in a memory card used by different terminals, or in a PCMCIA card that passes from one computer to another. It then becomes essential for each user system to guarantee all of the data in the memory. Putting the manager in the component is the best solution.

BRIEF DESCRIPTION OF THE DRAWING

The following description is given with reference to the accompanying drawing which is given by way of non-limiting example, and shows clearly what the invention involves and how it can be implemented.

DETAILED DESCRIPTION OF THE INVENTION

Figure 1:
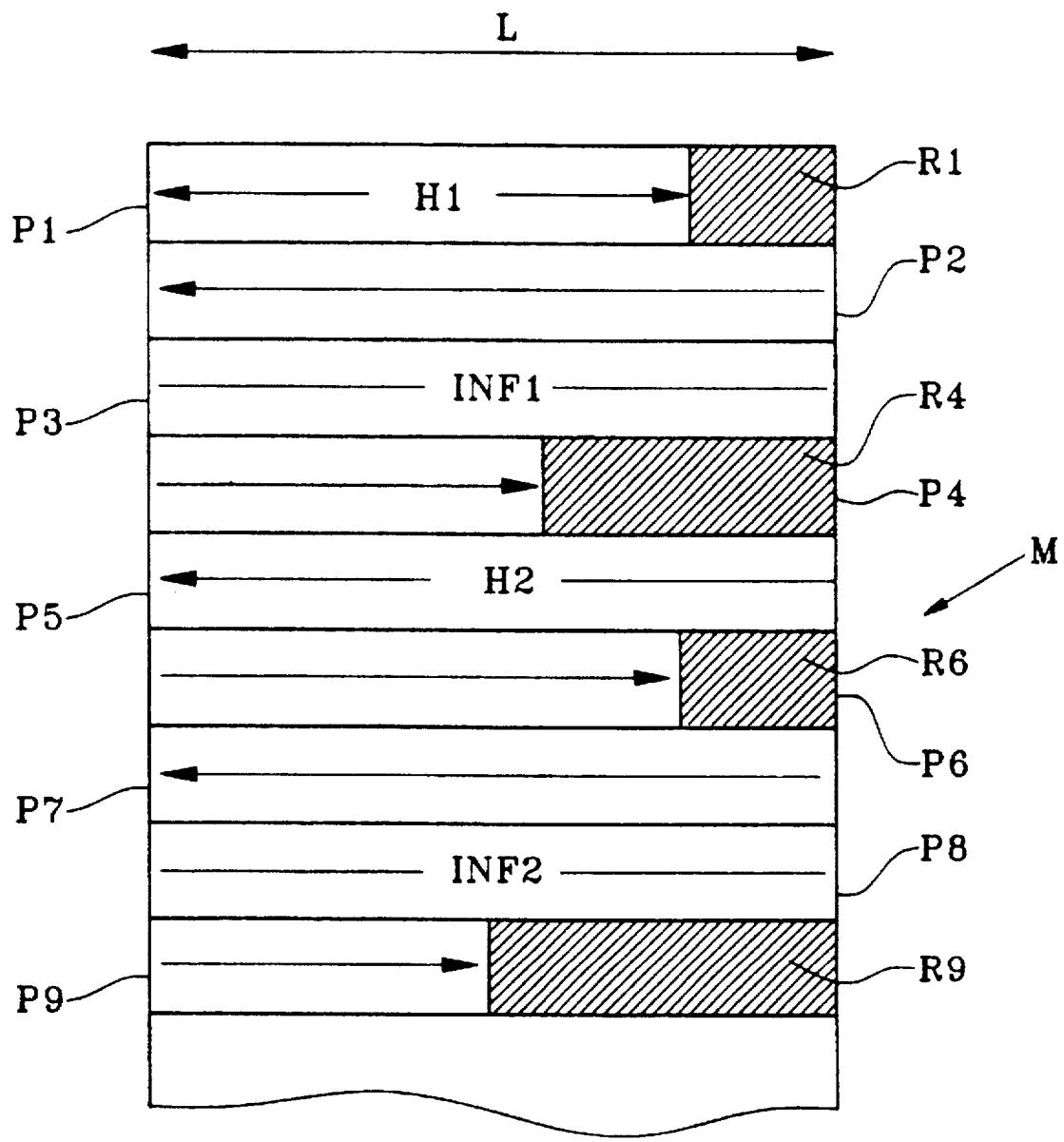
FIG. 1 is a diagram of an electrically erasable non-volatile memory of an electronic component of the invention.

The diagram of FIG. 1 shows an electrically erasable non-volatile memory M of EEPROM type or of flash EPROM type, for example, of an electronic component in which there is also implanted a manager for said memory M in the form of a programmed microprocessor. Advantageously, the memory M and the microprocessor constituting the memory manager are carried on a single semiconductor chip.

The memory M of FIG. 1 is designed to store information that is structured into logical entities managed by said memory manager as explained in detail above.

For example, the memory M may be segmented into byte-sized words so far as reading is concerned and into pages so far as erasure of said information is concerned, writing also being possible by page. Pages P1 to P9 of the memory M are shown diagrammatically in FIG. 1.

The size L of these pages is variable and lies, for example, in the range of four bytes to sixteen bytes.

As can be seen in FIG. 1, the memory manager is suitable, by means of an appropriate program, for organizing, i.e. synchronizing, the logical entities of one or more types into pages, i.e. each of said logical entities occupies, at least in part, an integer number of pages in exclusive manner.

In practice, if d is the logical size of a logical entity for which the memory M is synchronized, the number of pages occupied by said logical entity will be n+1, with:

$$d = nL + r$$

r being a remainder lying in the range 1 to L.

By way of example, the memory M of FIG. 1 is synchronized for file headers H1, H2 and for the corresponding file data INF1, INF2. For header H1, whose size is smaller than the page size L, the page P1 is occupied only partially by the data of H1, with the remainder of page P1 being left blank. It is thus possible to say that header H1 is of a logical size d that is smaller than one page while its physical size (n+1)L is one page.

Consequently, the following information INF1 is not written by the memory manager immediately after the header H1 in page P1, but starting from the beginning of the following page P2. The data INF1 has a logical size lying between two pages and three pages, but its physical size (n+1)L is three pages, since page P4 is occupied in part only, and the remainder R4 of said page is left blank.

The second header H2 is written by the memory manager starting from the beginning of the next page P5, and not immediately after INF1 in page P4, and it continues part way into page P6, with the remainder R6 being left blank. The same applies to the data INF2 which occupies pages P7 and P8 in full plus a part of page P9, the remainder R9 being left blank.

It will be understood that under such conditions, in order to modify the data INF1, for example, it is necessary to erase pages P2, P3, and P4 completely, and then to rewrite new data in those pages.

Supposing the electronic component is disconnected in an untimely manner from its external power supply system while this operation is taking place, then only the data INF1 will be lost, whereas if part of the header H2 had been written in the remainder R4 of page P4 unoccupied by INF1, then that portion of header H2 would also be lost with all of the unfortunate consequences that could stem therefrom.

Although a preferred embodiment of the invention has been described in detail above, various modifications thereto will be readily apparent to one with ordinary skill in the art. For example, provision may be made in a page that is to be partially unoccupied, for the memory manager to be suitable for creating a derived logical entity that completely occupies all of the pages of said integer number of pages. Starting from a header H1 of logic size smaller than one page, the memory manager could create a header H'1, derived from H1, and of logical size equal to one page, the physical size of H1, concatenating the blank remainder R1 of page P1 in H1. Stated another way, for a logical entity of logical size $d=nL+r$ and physical size $(n+1)L$, the rest of the $(n+1)$th line, i.e. a blank logical entity of logical and physical size $L-r$, would be added to form a new entity that has both a logical and physical size of $(n+1)L$. This and other modifications are intended to fall within the scope of the invention as defined by the following claims.

I claim:

1. A method of storing information in an electrically erasable non-volatile memory, such information being structured into logical entities, comprising the steps of:

segmenting the memory into pages, each of which includes a plurality of bits from the memory that are erasable together;

organizing at least a selected one of the logical entities into data pages sized to correspond with the memory pages;

arranging the information stored in the memory so that said at least one selected logical entity occupies, in an exclusive manner, an integer number of the memory pages.

2. The method according to claim 1, wherein, if a memory page is occupied in part by said selected logical entity, the remainder of such memory page is left blank.

3. The method according to claim 1, wherein, when a memory page is to be occupied in part by said selected logical entity, creating a derived logical entity that occupies in full all of the pages of said integer number of pages.

4. The method according to claim 1, wherein said logical entities are of the directory type.

5. The method according to claim 1, wherein said logical entities are of the file type.

6. The method according to claim 1, wherein said logical entities are of the file record type.

7. The method according to claim 1, wherein said logical entities are of the header type.

8. The method according to claim 1, wherein the organizing and arranging steps are controlled by a memory manager, and further comprising the step of implanting the memory manager in a component with said memory.

9. The method according to claim 8, wherein said memory manager is a microprocessor with a program.

10. The method according to claim 9, wherein the component is included in an electronic memory card, and said electrically erasable non-volatile memory and said microprocessor are carried by a single semiconductor chip.

11. The method according to claim 9, wherein the component is included in an electronic memory key.

12. The method according to claim 9, wherein the component is included in a PCMCIA card.

13. The method according to claim 1, wherein said electrically erasable non-volatile memory is of the EEPROM type.

14. The method according to claim 1, wherein said electrically erasable non-volatile memory is of the flash EPROM type.

15. The method according to claim 8, wherein said memory manager is suitable for detecting corruptions of information and for restoring said information.

16. The method according to claim 8, wherein the component is in electronic memory devices that are electrically powered by an external power supply system and that are liable to be disconnected in an untimely manner from said external power supply system.

* * * * *